United States Patent [19]

Cory et al.

[11] 4,261,546
[45] Apr. 14, 1981

[54] QUARTER-TURN VALVE ACTUATOR

[75] Inventors: John M. Cory; Ronald A. Olansen, both of Old Lyme, Conn.; Joseph A. Wucik, Jr., Westerly, R.I.

[73] Assignee: Posi-Seal International, Inc., Stonington, Conn.

[21] Appl. No.: 162,776

[22] Filed: Jun. 25, 1980

Related U.S. Application Data

[63] Continuation of Ser. No. 911,794, Jun. 2, 1978, abandoned.

[51] Int. Cl.³ .......................................... F16K 31/126
[52] U.S. Cl. ............................... 251/58; 74/25; 74/516; 251/229; 251/279
[58] Field of Search ................. 251/58, 229, 279, 280, 251/306; 74/424.8 VA, 516, 25

[56] References Cited

U.S. PATENT DOCUMENTS

| | | | |
|---|---|---|---|
| 2,165,985 | 7/1939 | Schwentler | 74/516 |
| 2,269,382 | 11/1962 | Schmidt | 251/58 |
| 2,809,011 | 10/1957 | Davis | 251/233 |
| 2,839,082 | 6/1958 | Moore | 251/279 |
| 3,034,760 | 5/1962 | Henrion | 251/306 |
| 3,204,920 | 9/1965 | Generke | 251/58 |
| 3,452,961 | 7/1969 | Forsman | 251/58 |
| 3,490,294 | 1/1970 | Antrim | 74/516 |
| 3,602,478 | 8/1971 | Cains | 251/58 |
| 3,929,058 | 12/1975 | Smith | 251/58 |
| 4,050,670 | 9/1977 | Borg et al. | 251/229 |
| 4,149,561 | 4/1979 | Dalton | 251/229 |

FOREIGN PATENT DOCUMENTS

| | | |
|---|---|---|
| 1220037 | 1/1961 | France . |
| 74986 | 1/1961 | France . |
| 1425399 | 12/1965 | France . |
| 1437588 | 3/1966 | France . |
| 1460561 | 12/1966 | France . |
| 2159755 | 3/1973 | France . |
| 2304957 | 3/1975 | France . |

OTHER PUBLICATIONS

"Actuator Unit Series BC" of Neles Oy, Helsinki, Finland.

*Primary Examiner*—Martin P. Schwadron
*Assistant Examiner*—G. L. Walton
*Attorney, Agent, or Firm*—Kenyon & Kenyon

[57] ABSTRACT

A power-driven quarter-turn valve actuator includes a reciprocating drive member in the form of a rod mounted perpendicularly to and spaced a preselected distance from a valve stem. A crank arm is coupled to the valve stem so that the axis of the crank arm makes an angle of between approximately 60° and 100° with a line intersecting the stem axis and perpendicular to the rod axis when the valve is shut and makes an angle of between minus 30° and plus 10° with said line when the valve is fully open. A link member connects the outer end of the crank arm to a point on the reciprocating rod. The preselected distance between actuator rod and valve stem, and the lengths of the crank arm and link, are chosen to produce a variable actuator torque output curve that closely matches the operating torque requirements of the valve. Preferably, the length of the link is at least equal to the preselected distance between the actuator rod and the valve stem, and the length of the crank arm is greater than the length of the link but less than twice said preselected distance. A pneumatic diaphragm motor drives the actuator rod from valve shut to valve open against a spring biasing means which urges the valve shut. Different spring rates can be provided to adapt the actuator to different available air pressures.

8 Claims, 5 Drawing Figures

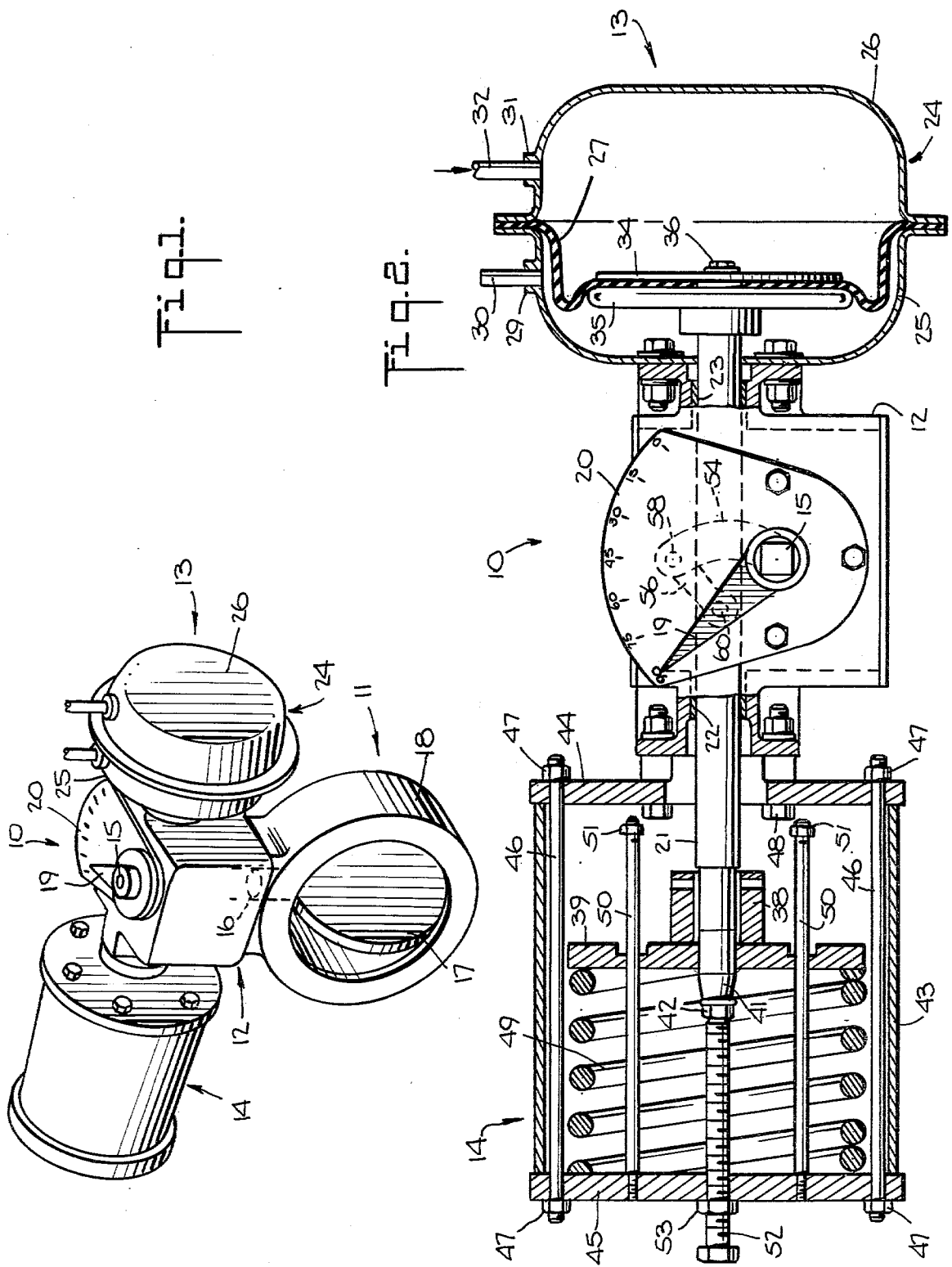

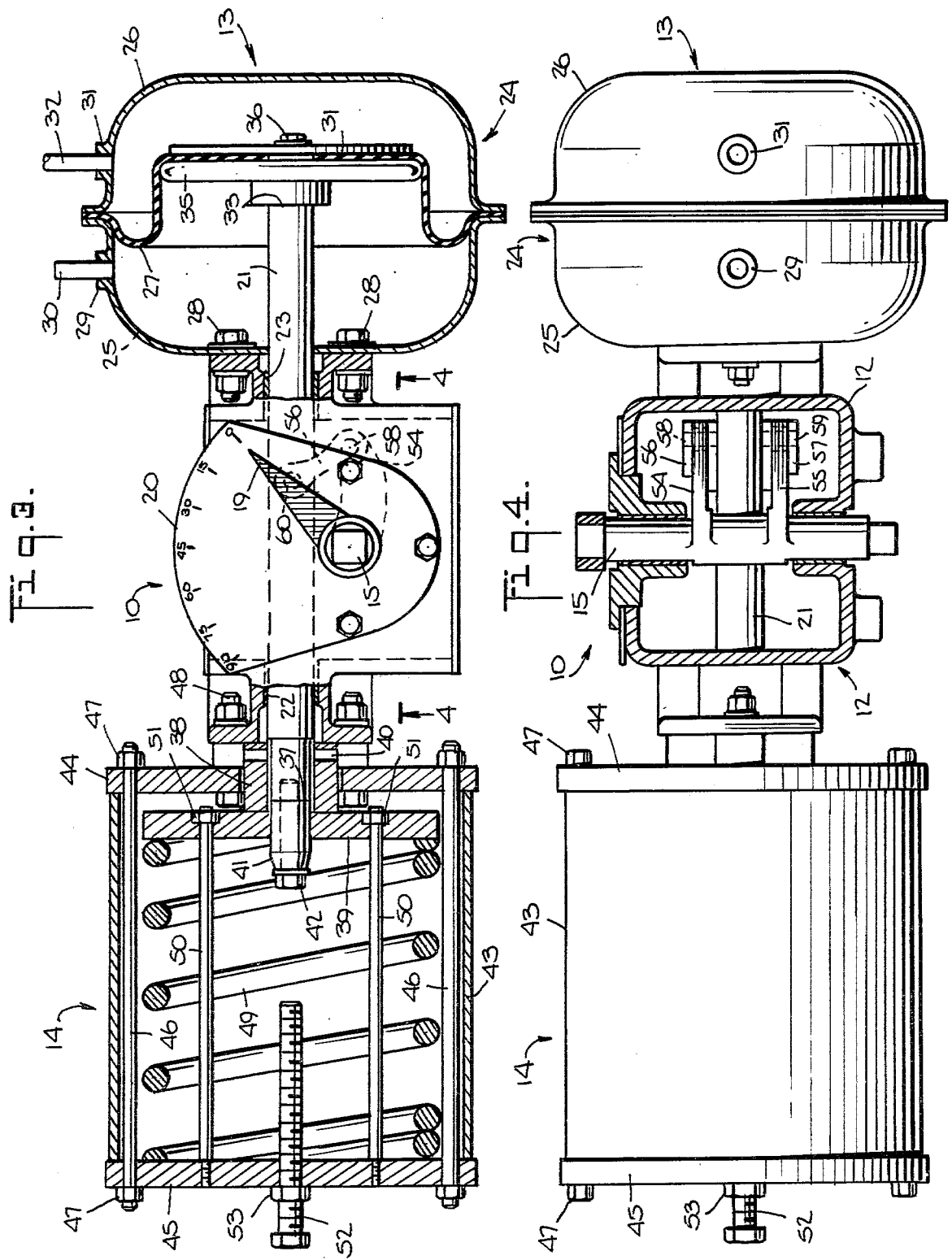

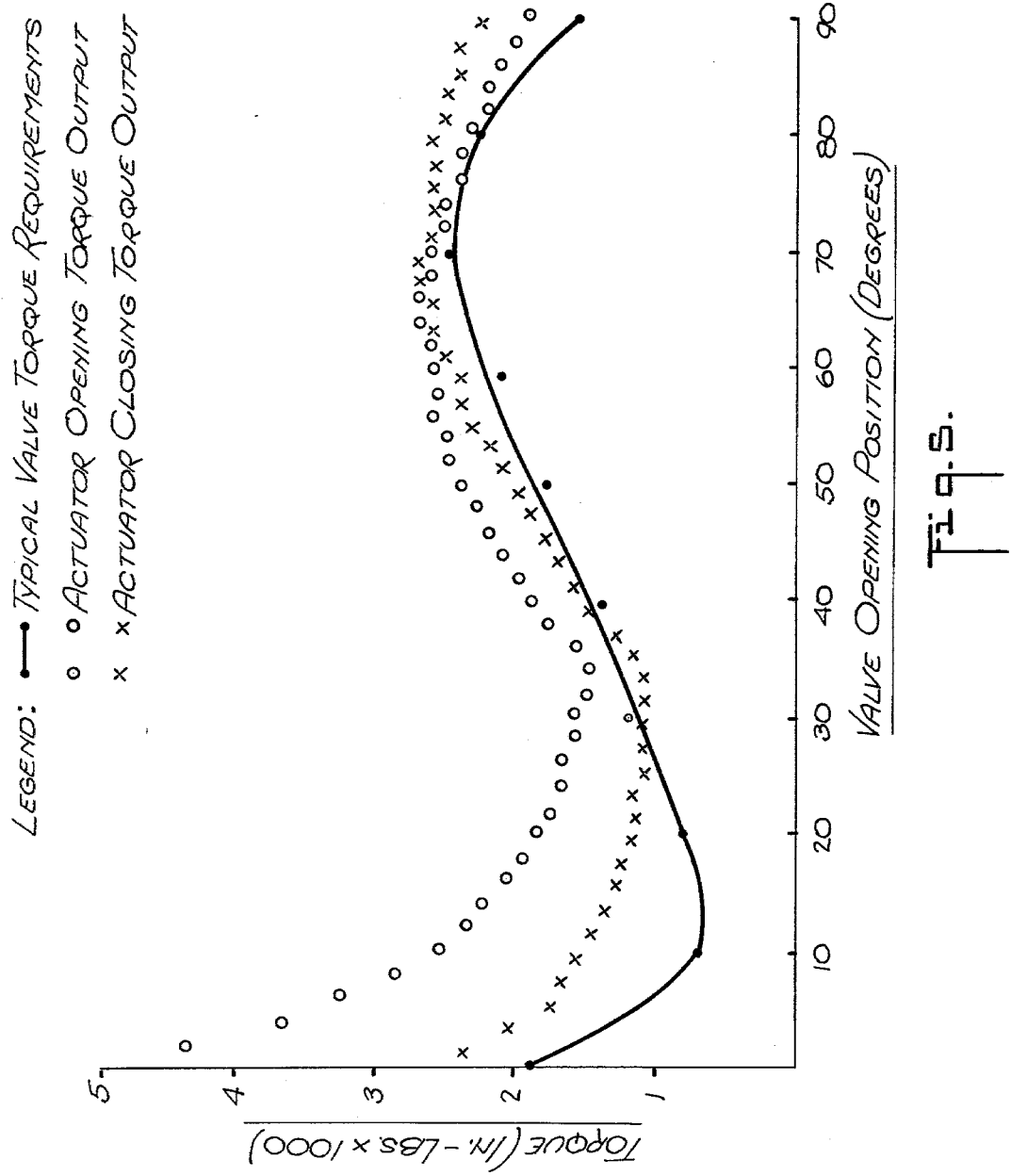

QUARTER-TURN VALVE ACTUATOR

This is a continuation of application Ser. No. 911,794 filed June 2, 1978 and subsequently abandoned.

BACKGROUND OF THE INVENTION

1. Field of the Invention

The present invention relates to valve actuators, and particularly to power-driven linear actuators for quarter-turn valves such as butterfly, plug, and ball valves.

2. Description of the Prior Art

Many industrial applications for quarter-turn rotary valves such as butterfly, plug, and ball valves call for remote-controlled valve operation, usually with a fail-safe requirement that the valve will shut automatically in the event of failure of the operating power source.

The components of a typical rotary valve actuator for such applications include a linearly reciprocal drive member, an active power source for applying linear force to the drive member, a stored power source for returning the drive member to its initial position, and a linkage for converting the linear motion of the drive member and force of the power source into rotary motion and torque for opening and shutting the valve. The active power source is usually a pneumatic or hydraulic diaphragm motor or piston and cylinder, and a compression coil spring is a typical stored power source.

For a quarter-turn valve, the torque requirements are dictated by three factors: a very high breakaway or opening torque to overcome the friction of the circumferential seal, a minimum torque, constant at all valve positions, due to packing friction, and hydrodynamic torque, which varies with valve position and depends upon the medium being handled and the flow conditions that prevail. For a butterfly valve, the maximum hydrodynamic torque normally occurs at about 70 degrees of valve rotation from the fully shut position.

A typical curve of torque as a function of valve angle for a butterfly valve, for example, will show a high value at the shut position, dropping rapidly to a minimum value of approximately 20% to 35% of the breakaway torque at an opening angle of around 15 degrees. The torque curve then increases to a second maximum value at the above-mentioned 70 degree open position which may be higher or lower than the breakaway torque at opening, depending on the flow rate and flowing medium. At the fully open 90 degree position, the torque curve typically will be lower than that at the 70 degree position but higher than the minimum torque at the 15 degree position. On the other hand, a typical torque curve for a plug valve or a ball valve is also high at opening but drops rapidly and remains low for the remainder of valve travel.

The torque output of the above described reciprocating actuators depends on, among other things, the type of linkage that connects the reciprocating drive member to the valve stem. The most common linkage employed by conventional reciprocating actuators is known as the 45 degree articulated crank. Another popular type of linkage is the scotch yoke.

In the 45 degree articulated crank, a crank arm fastened to the valve stem makes a 45 degree angle with the axis of reciprocation when the valve is shut. For a quarter-turn valve, the crank also makes a 45 degree angle with the drive axis when the valve is fully open. The free end of the crank is connected to the end of the drive member through a link. The drive member in this arrangement is usually offset from the valve stem by a distance such that a line extending along the drive axis intersects the connection point of the link with the crank arm in both the fully open and the shut positions of the valve.

The scotch yoke linkage comprises a crank having a longitudinal slot or the equivalent that engages a roller pin on a reciprocating actuator rod. Usually, the crank of the scotch yoke mechanism also makes a 45 degree angle with the axis of the actuator at the two end positions (i.e., shut and fully open).

Neither the 45 degree articulated crank nor the scotch yoke linkage produces an actuator torque output that reasonably matches the torque curve of a butterfly valve or a plug or gate valve. In particular, the output torque of a 45 degree articulated crank actuator exhibits an upwardly convex curve having a maximum value at about the midpoint and minimums at the shut and fully open positions. The output torque of a scotch yoke actuator, on the other hand, exhibits an upwardly concave curve having a minimum value at approximately the midpoint. Since both the active and the passive power sources must be sized to maintain the actuator torques for opening and shutting the valve, respectively, above the valve torque curve for the full 90 degree operating range, this means that for most of the range the actuator is over-designed. Stated another way, a larger and, therefore, more expensive actuator unit must be fitted for a given application than would be necessary if the maximum actuator output torque positions coincided with the valve maximum torque requirement positions.

SUMMARY OF THE INVENTION

The present invention provides an improved linkage for a reciprocating rod type of actuator for quarter-turn valves in which the output torque of the actuator for both valve opening and valve closing operations can be tailored to match the characteristic torque curve of such a valve.

Specifically, the invention provides a power-driven actuator for a valve having a valve stem rotatable approximately 90 degrees between a valve shut position and a valve open position, the actuator including a support structure adapted to be mounted on a valve adjacent to the valve stem, a drive member, means for mounting the drive member on the support structure for axial reciprocation in a plane substantially perpendicular to the axis of the valve stem such that the axis of reciprocation will be spaced from the axis of the valve stem by a preselected distance, and power drive means for reciprocating the drive member between a first position corresponding to the valve shut position and a second position corresponding to the valve open position.

The improvement of the present invention comprises:

a crank arm having one end adapted to be coupled to the valve stem such that the axis of the crank arm makes an angle of between approximately 60° to 100° with a line intersecting the stem axis and perpendicular to the drive axis of the actuator when the valve is in the shut position and makes an angle of between approximately −30° and 10° with said line when the valve is in the open position and a link member having a first end pivotally attached to the other end of the crank arm and a second end pivotally attached to the drive member.

Preferably, the crank arm is within plus 10 degrees or minus 30 degrees of exact parallelism with the drive axis at the first position of the drive member (valve shut), and the length of the link member is at least equal to the preselected distance between the drive axis of the actuator and the axis of the valve stem. In particular, it is desirable that the length of the link member is greater than the preselected distance between the drive axis of the actuator and the axis of the valve stem, and that the length of the crank arm is greater than the length of the link member.

In a preferred embodiment of the actuator, the axis of the link member makes an angle of between about 60 degrees and about 90 degrees (typically, approximately 60–70 degrees) with the axis of the crank member when the drive member is in the first (valve shut) position and an angle of between about 40 degrees and about 50 degrees (e.g., approximately 45 degrees) when the drive member is in the second (valve open) position.

Also in the preferred embodiment, the power drive means comprises both an active power source, such as a pneumatically-powered diaphragm motor, for opening the valve and a stored power source, such as a spring biasing means, for shutting the valve, or vice-versa, depending on whether the valve is desired to fail safe in the shut or in the open position. An actuator constructed according to the design of the preferred embodiment provides torque outputs in both the valve opening and valve shutting modes that closely match torque requirements of a typical quarter-turn valve, and particularly a butterfly valve.

The specific features and advantages of the invention will be described in more detail in connection with the preferred embodiment illustrated by the drawings.

BRIEF DESCRIPTION OF THE DRAWINGS

FIG. 1 is a perspective view of an actuator according to the invention installed on a wafer trunnion type of butterfly valve.

FIG. 2 is a top view of the actuator of FIG. 1, showing the active power source and the stored power source in section and the linkage in dashed outline, with the actuator in the valve open position.

FIG. 3 is a top view of the actuator of FIG. 1, showing the active power source and the stored power source in section and the linkage in dashed outline, with the actuator in the valve shut position.

FIG. 4 is a side view of the actuator partially in section taken along the line 4—4 of FIG. 3.

FIG. 5 is a graph of torque versus valve opening angle showing a typical valve torque requirement curve and calculated actuator output torques for valve opening and valve closing.

DETAILED DESCRIPTION OF THE PREFERRED EMBODIMENT

In FIG. 1, a preferred embodiment of a valve actuator 10 according to the invention is shown mounted on a wafer trunnion butterfly valve 11 of conventional design. The actuator comprises a support structure such as a housing 12 and a power drive means consisting of an active power source 13 mounted on one side of the housing and a stored power source 14 mounted on the other side. A rotatable output shaft 15 extends vertically through the actuator housing and is coupled by conventional means (not shown) to a stem 16 of a valve disc 17 rotatably mounted in body 18 of the valve. A pointer 19 attached to the upper end of shaft 15 indicates the position of the valve disc on a graduated angular scale 20.

The construction and operation of the actuator are illustrated in more detail in FIGS. 2–4. As shown in these figures, a drive member such as rod 21 extending horizontally through housing 12 with its axis spaced from the axis of vertical shaft 15 is mounted for reciprocal movement parallel to its axis in sleeve bearings 22 and 23 at opposite sides of the housing. The active power source 13 preferably is a pneumatically powered diaphragm motor having a pressure-tight casing 24 formed by two concave flanged shells 25 and 26. The flanges of the two shells are bolted or otherwise clamped together, with a flexible diaphragm 27 sandwiched between them.

Shell 25 is attached by bolts 28 to one side of the actuator housing and has a pipe boss 29 for connection to a vent 30. Shell 26 has a similar pipe boss 31 for connection to a pipe 32 leading to a source of air pressure (not shown).

One end 33 of actuator rod 21 bears upon diaphragm 27, which is clamped between discs 34 and 35 by means of a cap screw 36. Adjacent to the other end 37 of actuator rod 21 is threaded a cylindrical spring stop 38 which bears against a spring bearing plate 39 and can be adjusted by a spanner wrench engaging holes 40. Also attached to the other end of the actuator rod is a tapered centering post 41 by means of a cap screw 42, for centering spring bearing 39 on the actuator rod.

Stored power source 14 is an assembly comprising a cylindrical shell 43 clamped between end plates 44 and 45 by threaded tie rods 46 and nuts 47. End plate 44 is attached to the other side of actuator housing 12 by bolts 48. The source of stored power is a compression coil spring 49 positioned between spring bearing plate 39 and end plate 45. Safety rods 50, which are slidably inserted through holes in bearing plate 39, are screwed into threaded holes in end plate 45, and have nuts 51 threaded onto their free ends, to prevent inadvertent disassembly of the compressed spring cartridge. The fully open position of actuator rod 21 is determined by a stop bolt 52 threaded through end plate 45 and adjustably secured with a lock nut 53, while the shut position is determined by adjustment of threaded stop 38 on the actuator rod.

It will be understood that other arrangements and power sources, such as hydraulic or pneumatic cylinders and pistons, electric motors with rack and pinion or worm drives and so forth, may be substituted for the described reciprocating rod drive means, if desired.

The illustrated design is particularly preferred, however, because it lends itself readily to interchangeability of components, so that larger or smaller diameter diaphragm motors and various sizes of springs can be used, depending on the maximum output torque requirements for a given application. This interchangeability is important because the valve torque requirements depend not only on the size of valve and type of valve seat and seals but also on the fluid being handled, its pressure and flow rate, and the value of the available air pressure for operating the diaphragm motor.

As indicated previously, an important feature of the present invention is the linkage between the rotatable output shaft 15 and the reciprocating actuator rod 21. As shown in FIGS. 2–4, this linkage comprises a crank arm in the form of a clevis having a congruent pair of curved arms 54 and 55, integrally formed on shaft 15 and spaced apart to clear the top and bottom, respectively, of the actuator shaft. A pair of identical connecting links 56 and 57 are each pivotally connected at one end to the free end of the corresponding arm 54, 55 by pins 58, 59 and are each pivotally connected at the other end to the actuator rod by a vertical pin 60.

The operation of the actuator can be understood by comparing FIG. 2 with FIG. 3. In FIG. 2 the actuator rod has been forced by air introduced under pressure through pipe 32 all the way to the left, so that cap screw 42 holding centering post 41 onto the left end of the rod contacts the tip of adjustable stop bolt 52. In this position spring 49 is under maximum compression, and pointer 19 is opposite 90 on the graduated scale, corresponding to the fully open valve position shown in FIG. 1.

In the fully open position of FIG. 2 it can be seen that the axis of crank arm 54 is within the range of minus 30 degrees to plus 10 degrees of perpendicularity to the axis of the actuator rod, and that the axis of arm 54 makes an angle of approximately 40-50 degrees with the axis of link 56. It is also apparent that the length of crank arm 54 is greater than the distance between the rod axis and the axis of shaft 15, but less than twice this distance.

To shut the valve, it is necessary to release the air pressure in the chamber formed between the diaphragm and shell 26 by a suitable valve means in pipe 32 (not shown). The stored power in compressed spring 49 then urges the actuator rod to the right until spring stop 38 contacts the flanged end of housing 12, as shown in FIG. 3.

In this position, pointer 19 is opposite 0 on the graduated scale, indicating that the valve is closed. It can be seen from the dashed-line positions of crank arm 54 and link 56 in FIG. 3 that, when the actuator rod is in its first, or valve shut, position, the axis of the crank arm is within plus 10 degrees and minus 30 degrees of being parallel to the axis of the actuator rod and that the axis of the crank arm makes an angle of approximately 60-70 degrees with the axis of the link. It is also apparent that link 56 is longer than the distance between the axis of the actuator rod and the axis of shaft 15, but that the crank arm is longer than the link.

The foregoing dimensional relations between the spacing of rod 21 from shaft 15 and the lengths of the crank arm and link and the angular relations between the crank arm and the link have been found to provide actuator opening and closing torque output curves that closely match the torque requirements of a butterfly valve.

In particular, it has been found that by arranging the crank arm so that it is within plus 10 degrees and minus 30 degrees of parallelism to the rod axis in the valve shut position, the linkage approaches a toggle action in this position that amplifies the force acting on rod 21. The dimensional relation between link length and arm length has the added advantage (for butterfly valve operation) of producing a second maximum output torque at about the 70 degree valve open position.

The close match between actuator torque output and valve torque requirements is illustrated by FIG. 5, in which the solid line curve is based on calculations for a typical butterfly valve. From this curve it can be seen that the breakaway torque at 0 degrees (i.e. valve shut) is slightly less than 2000 inch-pounds. The operating torque drops to a minimum of about 700 inch-pounds between the 10 degree and 20 degree valve open positions, rises to a second maximum of about 2500 inch-pounds at approximately the 70 degree valve open position, and then falls again to about 1000 inch-pounds at the full open position.

The corresponding actuator opening and closing output torques were calculated by use of the following equations:

$$T = C_f(1 - C_s)\frac{\sin\beta}{\cos\phi} F_A \cdot L_1 \tag{1}$$

where:
T = torque
$C_f$ = friction factor
$C_s$ = spring factor
$\beta$ = angle between crank arm and link
$\phi$ = angle between link and drive axis
$F_A$ = force due to active power source
$L_1$ = length of crank arm The relations between the angles $\beta$ and $\phi$ and the lengths of the crank arm and link, the offset distance between the drive axis and the crank axis, and the angle of the crank with the drive axis are given by:

$$\beta = \theta + \phi \tag{2}$$

and $$\phi = \sin^{-1}\frac{[R - L_1 \sin\theta]}{L_2} \tag{3}$$

where:
$\theta$ = angle between crank arm and drive axis
$L_2$ = length of link
R = offset between drive axis and crank shaft axis For the linkage geometry, the friction factor $C_f$ and spring factor $C_s$ can be determined by:

$$C_f = \frac{1}{1 + \mu \tan\phi} \tag{4}$$

where $\mu$ = coefficient of friction and $$C_s = K_1 + \frac{O}{90}(K_2 - K_1) \tag{5}$$

where
$K_1$ = spring force as % $F_A$ at actuator position 1
$K_2$ = spring force as % $F_A$ at actuator position 2

Iterated solutions of the above equations yield an optimum actuator design having the following values for the various parameters involved.
Effective diaphragm diameter—6.75 in.
Air pressure—60 psi
Spring constant—900 lb/in
Crank arm length—2.22 in
Link length—1.37 in
Rod/shaft offset distance—1.25 in
Coefficient of friction—0.1

It is clearly apparent from FIG. 5 that both the opening and closing torque outputs of the actuator closely match the required torque curve of the valve. Of course, different valve sizes and different operating conditions than those assumed will produce different required torque values, but the general shape of a butterfly valve torque curve in each case will be similar. Other types of quarter-turn valves will have somewhat different characteristic curves, as indicated earlier.

By choosing initial and final crank angles to be within minus 30° to plus 10° of parallelism and perpendicularity, respectively, to the drive axis, and by selecting crank and link lengths related to the offset distance according to the guidelines described above, it is possible to provide an actuator linkage that produces output torques that closely match the shape of the required torque curve for a quarter-turn valve. By suitable selection of effective diaphragm diameter to correspond with the available air pressure, the necessary opening torque amplitudes can be achieved. A similar selection of spring rate (or rates if two or more concentric springs are used) produces the necessary closing torque amplitudes.

As a result, the valve actuator of the present invention can provide torque output tailored to match closely the characteristic torque curve of quarter-turn valves of any type, and particularly of butterfly valves.

What is claimed is:

1. A power-driven actuator for a valve having a valve stem rotatable approximately 90 degrees between a valve shut position and a valve open position, the actuator including a support structure adapted to be mounted on a valve adjacent to the valve stem, a drive member, means for mounting the drive member on the support structure for axial reciprocation in a plane substantially perpendicular to the axis of the valve stem such that the axis of the drive member will be spaced from the axis of the valve stem by a preselected fixed distance, and power driven means for reciprocating the drive member along a fixed axis between a first position corresponding to the valve shut position and a second position corresponding to the valve open position, wherein the improvement comprises:

a crank arm having one end adapted to be coupled to the valve stem for rotation thereof such that the axis of the crank arm makes an angle of between approximately 60° and 100° with a line intersecting the stem axis and perpendicular to the drive axis of the actuator when the valve is in the shut position and is within approximately minus 30° to plus 10° of perpendicularity to the drive axis of the actuator when the valve is in the open position; and a link member having a first end pivotally attached to the other end of the crank arm and a second end pivotally attached to the drive member such that force is transmitted from the drive member to the crank arm only along the axis of said link member, the length of the link member being greater than the preselected distance between the drive axis of the actuator and the axis of the valve stem, the length of the crank arm is greater than the length of the link member, and the axis of the link member makes an angle of between about 60° and about 70° with the crank member when the drive member is in the first position, the lengths of the crank arm and the link in relation to said preselected distance are predetermined to produce a torque at one end of the crank arm having a first maximum torque value when the crank is in the valve shut position and a second maximum torque value when the crank arm is at a position intermediate the valve shut and valve open positions, a first minimum output torque value is produced between the first and second maximum output torques values and a second minimum output torque value being produced at the full valve open position.

2. A valve actuator according to claim 1 wherein the axis of the link member makes an angle of approximately 66 degrees with the axis of the crank member when the drive member is in the first position.

3. A valve actuator according to claim 1 wherein the length of the link member is greater than said preselected distance, and the length of the crank arm is greater than the length of the link member but less than twice said preselected distance.

4. A valve actuator according to claim 1 wherein the drive member comprises an actuator rod, and the power drive means comprises an active power source for driving the actuator rod from the first position to the second position and a stored power source for urging the actuator rod from the second position to the first position.

5. A valve actuator according to claim 1 wherein the drive member comprises as actuator rod, and the power drive means comprises a pneumatically-powered motor for driving the actuator rod from the first position to the second position and spring biasing means for urging the actuator rod from the second position toward the first position.

6. A valve actuator according to claim 5 wherein the pneumatically-powered motor is a single-acting diaphragm motor, and the spring biasing means drives the actuator rod from the second position to the first position.

7. A valve actuator according to claim 1 wherein the second maximum torque value is produced at a crank arm position between approximately one-half of the crank rotation angle and the full crank rotation angle from the valve shut to the valve open positions.

8. A valve actuator according to claim 1 wherein the second maximum torque value is produced at a position corresponding to approximately 70 degrees of crank rotation angle from the valve shut position.

* * * * *